United States Patent
Peterson et al.

(10) Patent No.: US 6,787,948 B2
(45) Date of Patent: Sep. 7, 2004

(54) STATOR CONSTRUCTION FOR HIGH PERFORMANCE ROTATING MACHINES

(75) Inventors: William Anders Peterson, Vestal, NY (US); Arthur Paull Lyons, Maine, NY (US)

(73) Assignee: BAE SYSTEMS Controls Inc., Johnson CIty, NY (US)

( * ) Notice: Subject to any disclaimer, the term of this patent is extended or adjusted under 35 U.S.C. 154(b) by 15 days.

(21) Appl. No.: 09/894,114

(22) Filed: Jun. 29, 2001

(65) Prior Publication Data

US 2003/0001441 A1 Jan. 2, 2003

(51) Int. Cl.[7] .............................. H02K 3/24; H02K 9/19
(52) U.S. Cl. ............................. 310/58; 310/52; 310/62; 310/180; 310/214
(58) Field of Search ................................ 310/179–180, 310/184, 195–196, 198, 208, 213, 215, 52, 53, 54, 45, 60 R, 62, 63, 60 A, 58, 59, 43, 214

(56) References Cited

U.S. PATENT DOCUMENTS

| | | | | |
|---|---|---|---|---|
| 518,946 A | * | 5/1894 | Forbes | 310/59 |
| 3,082,337 A | * | 3/1963 | Horsley | 310/64 |
| 3,287,580 A | * | 11/1966 | Broniewski et al. | 310/58 |
| 3,715,610 A | * | 2/1973 | Brinkman | 310/58 |
| 3,743,867 A | * | 7/1973 | Smith, Jr. | 310/52 |
| 3,995,181 A | * | 11/1976 | Suit | 310/58 |
| 4,037,312 A | * | 7/1977 | Deis | 310/43 |
| 4,227,108 A | * | 10/1980 | Washizu et al. | 310/58 |
| 4,385,252 A | * | 5/1983 | Butman et al. | 310/214 |
| 4,908,347 A | * | 3/1990 | Denk | 310/52 |
| 5,175,396 A | * | 12/1992 | Emery et al. | 174/36 |
| 5,670,838 A | | 9/1997 | Everton | 310/254 |
| 5,808,387 A | * | 9/1998 | Akachi et al. | 310/58 |
| 6,239,519 B1 | * | 5/2001 | Kaelberer et al. | 310/58 |
| 6,498,415 B1 | * | 12/2002 | Emery | 310/196 |

* cited by examiner

Primary Examiner—Burton Mullins
(74) Attorney, Agent, or Firm—Paul J. Esatto, Jr.; Geoffrey H. Krauss (57) ABSTRACT

A rotating machine which includes a stator having a number of field winding slots, a number of field windings disposed in each of the field winding slots, at least two of the field windings have an outer jacket; and a number of conductive wires disposed within and enclosed by the outer jacket such that longitudinal passages are defined between the conductive wires. A pump circulates a coolant into and from the rotating machine through the longitudinal passages. Preferably, the rotating machine includes a housing that has a cavity for acceptance of the stator therein. The housing and stator define and second plenums at first and second ends of the stator. The coolant enters the rotating machine into the first plenum and exits the rotating machine from the second plenum.

13 Claims, 8 Drawing Sheets

STATOR CONSTRUCTION FOR HIGH PERFORMANCE ROTATING MACHINES

BACKGROUND OF THE INVENTION

1. Field of the Invention

The present invention relates generally to rotating machines such as electric motors and generators and, more particularly, to cooling the field windings of the stator of electric motors, alternators and generators.

2. Prior Art

There have been very many proposals intended to improve the operation of transducers for electrical power/mechanical power conversion (motors, generators, or alternators). However, there are still areas where the use of electric motors remains impractical, for example for use as the main drive of a vehicle such as an automobile. Present electric motors are generally too large, heavy, and produce too little power (especially at high speed) for commercial use in a vehicle such as an automobile.

One problem associated with electrical machines, such as electric motors, is that it is necessary to cool them because they generate heat which reduces their efficiency. Motors that are driven by inverters have a high frequency component of current in their windings due to the high frequency pulse width modulation of the inverter. This high frequency component adds to the losses in the stator winding by both the increased RMS current it represents and by the skin and proximity effects in the wire. Conductor losses in a motor represent a large part of the total losses in a well designed motor.

At present, such machines may be cooled by blowing air through or over them. For heavy duty applications it is known to spray oil onto the rotor and stator assemblies and into the gap between them using a high pressure pump. A scavenger pump may also be provided to collect the sprayed oil for re-cycling. The need for optimization in cooling is even more important as some applications of electric motors demand high efficiency in compact packages.

A common configuration for such motors is to have an inner rotor mounted on a straight shaft supported by bearings on the ends. The bearings are mounted in end covers that support and locate the rotor in the center of a current-carrying stator. The rotor contains multiple current-carrying bars which run length wise parallel to the shaft and are located near the outer circumference of the rotor. Heat is produced in the rotor and stator when the current in the stator excites the bars. Heat dissipation limits the design of the stator.

In a typical electric rotating machine where heat dissipation is required, it is customary to circulate a cooling medium in the outer structural jacket of the machine if the cooling medium is a liquid. Whereas, if the medium is air, the flow is then routed through the center and outside shell of the device.

Figure 1:
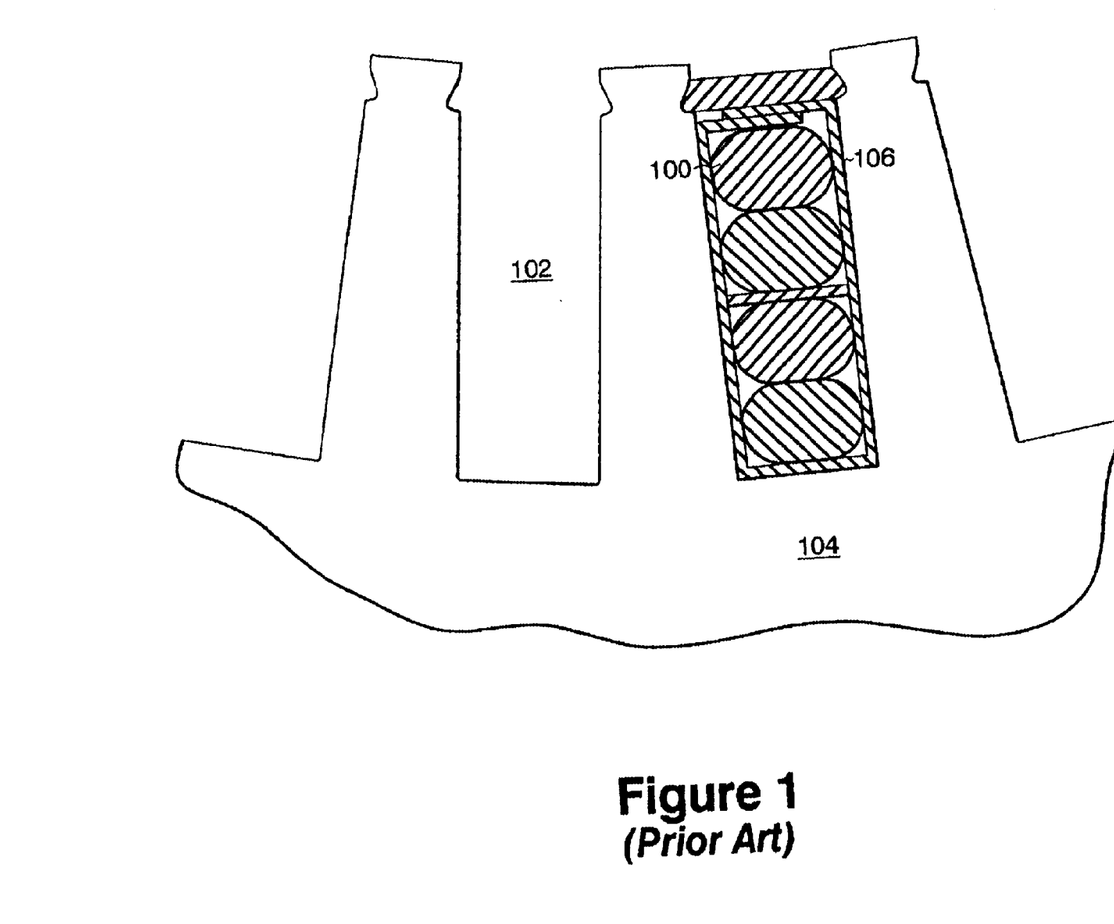
FIG. 1 illustrates a conventional stack of field windings in a stator slot.

A transverse cross-section of the stator field windings of a prior-art motor is illustrated in FIG. 1. In this design, the electromagnetic conductors 100 are housed in a slot 102 of a stator 104. The conductors 100 are cooled by the longitudinal flow of a synthetic oil between the interstices of the wires large external radii and the region formed by an interior wall of a slot liner 106. Maintaining this cross-sectional area open along the longitudinal axis of the stator 104 has proven to be very difficult during the manufacturing process of the motor and this creates a high fluid flow pressure drop. This problem ultimately manifests itself when the fixed power output of the oil pump delivery system cannot deliver the designed mass flow of the oil that is needed to sufficiently cool the conductors 100 where enormous heat is generated due to internal electrical resistance.

This particular electric motor designed for an electric vehicular application produces 450 lb-ft of torque and 250 HP at normal steady state conditions but coolant oil leaking from the stator slots into the air gap between the stator and rotor bodies causes hydrodynamic drag which leads to significant power transmission inefficiencies. Furthermore, the incessant impact of the rotor into this entrapped oil causes hardware damage due to cavitation and heat build up. Thus, the cooling oil meant to absorb the heat from the conductors 100 typically leaks from the interstices, causing an obstruction to the mechanical function of the motor.

Figure 2A:
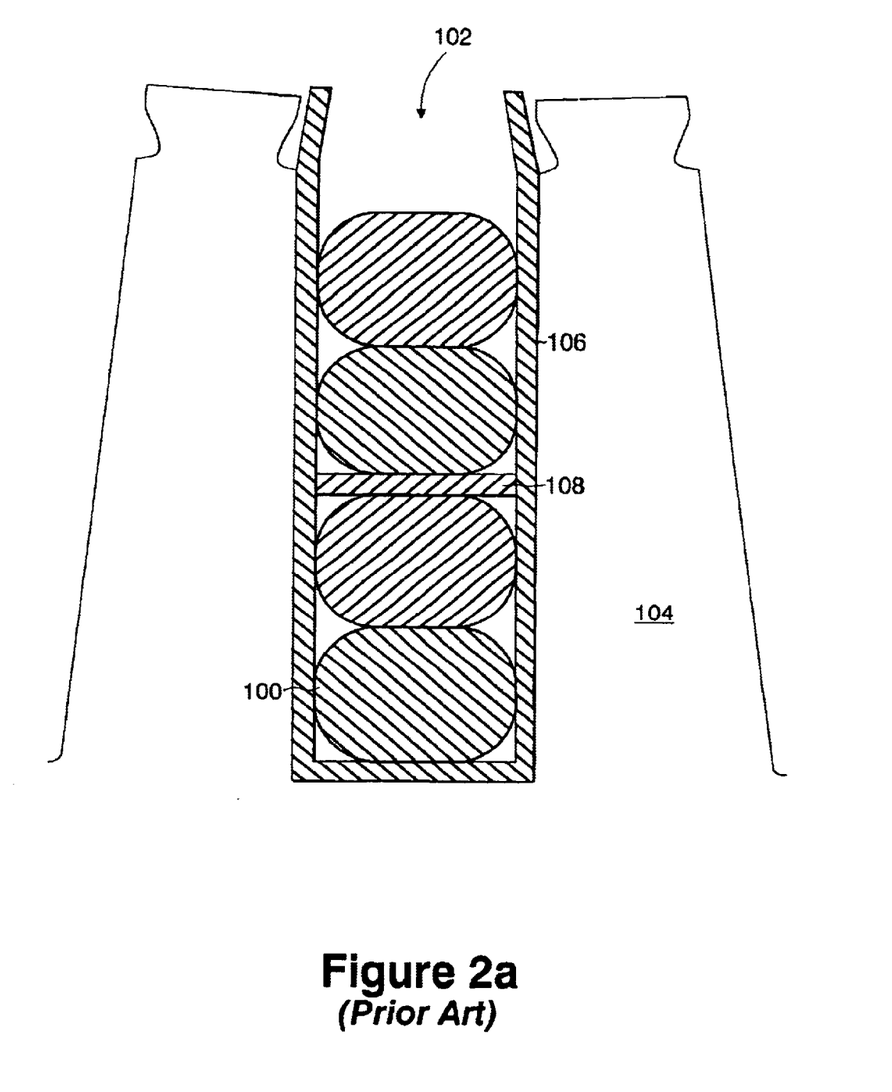
FIGS. 2a–2d illustrate a conventional method for creating coolant passageways in the stator slot of FIG. 1.

The process to form these interstices in each slot 102 is tedious and fraught with manufacturing risk. FIGS. 2a to 2d illustrate this. FIG. 2a illustrates Nomex/Kapton/Nomex (NKN) slot liners 106 which are placed in each stator slot 102 followed by a pair of pre-formed solid magnetic conductors 100. A center stick 108 made of a modified fiberglass cloth saturated with a high temperature phenolic resin (PCGP-HT) material placed between them separates the upper and lower conductors 100.

Figure 2B:
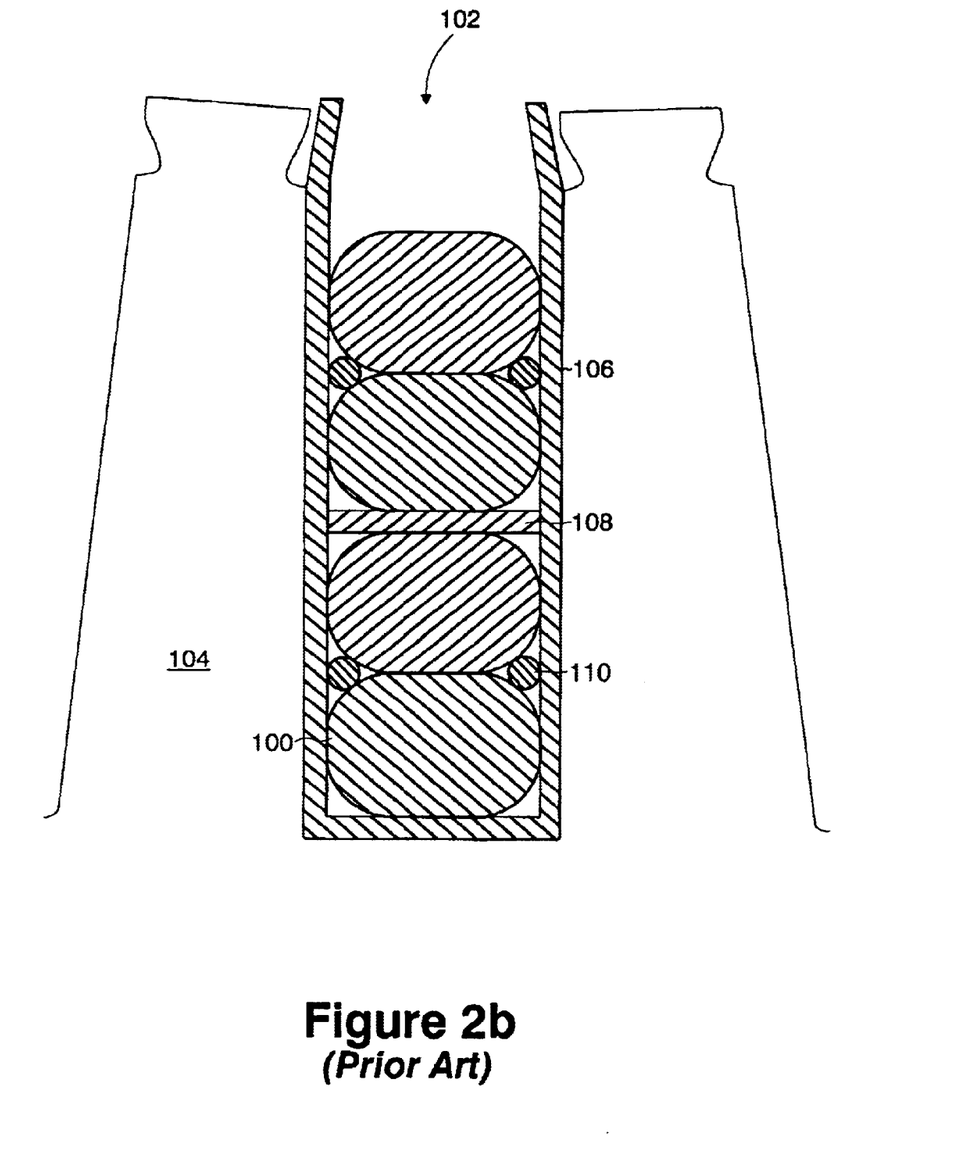
Figure 2C:
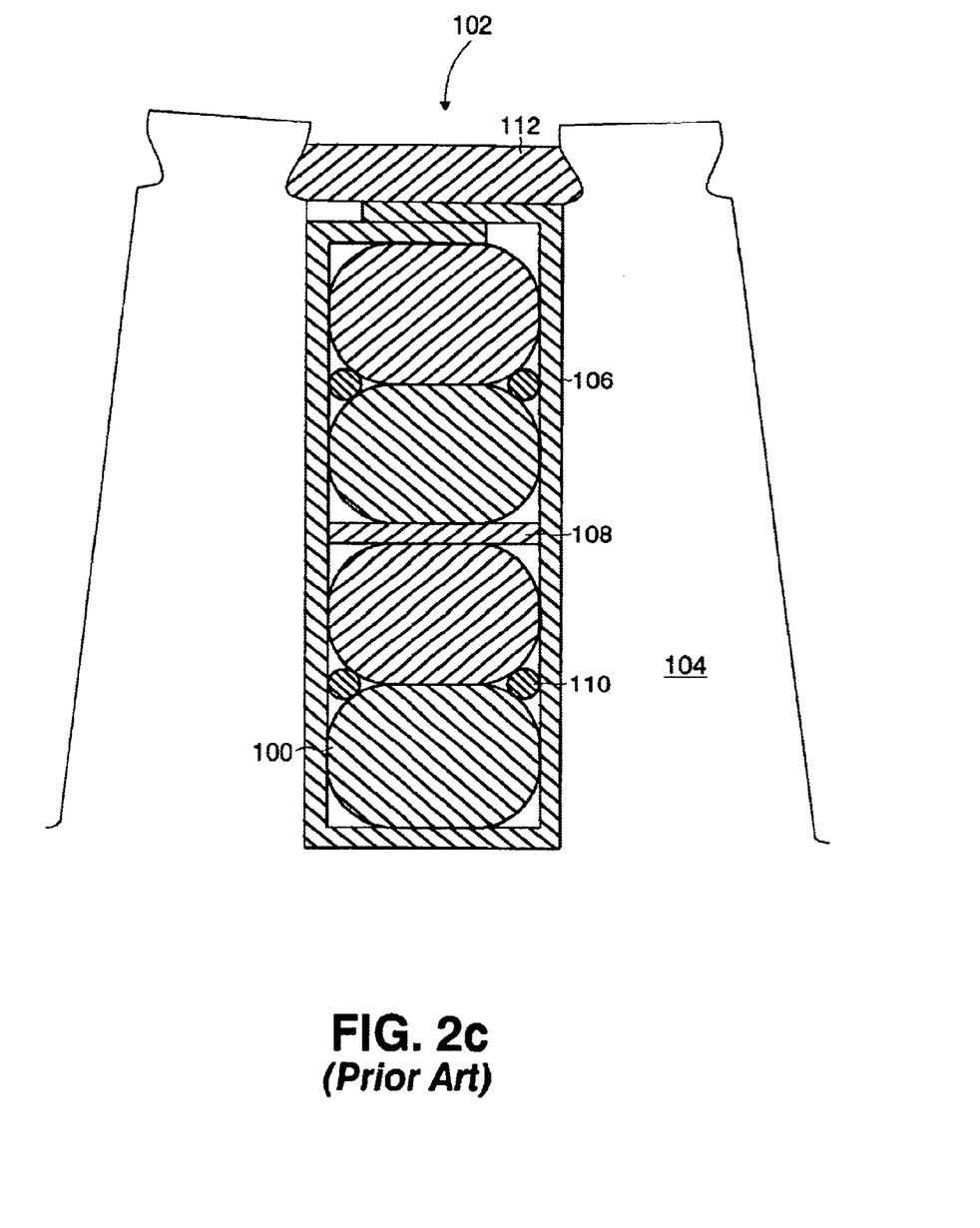

As illustrated in FIG. 2b, four 0.030 inch diameter steel wires 110 are then inserted into the interstitial space between the conductors 100 and slot liners 106. As illustrated in FIG. 2c, a PCGP-HT top stick 112 is then carefully inserted into place. After making the welded connections on the wires and buss ring terminals, the entire stator sub-assembly is then dipped into a bath of Doryl B-109-9 electrical insulating varnish under vacuum. After the excess varnish is drained, the stator sub-assembly is placed in a curing oven.

Figure 2D:
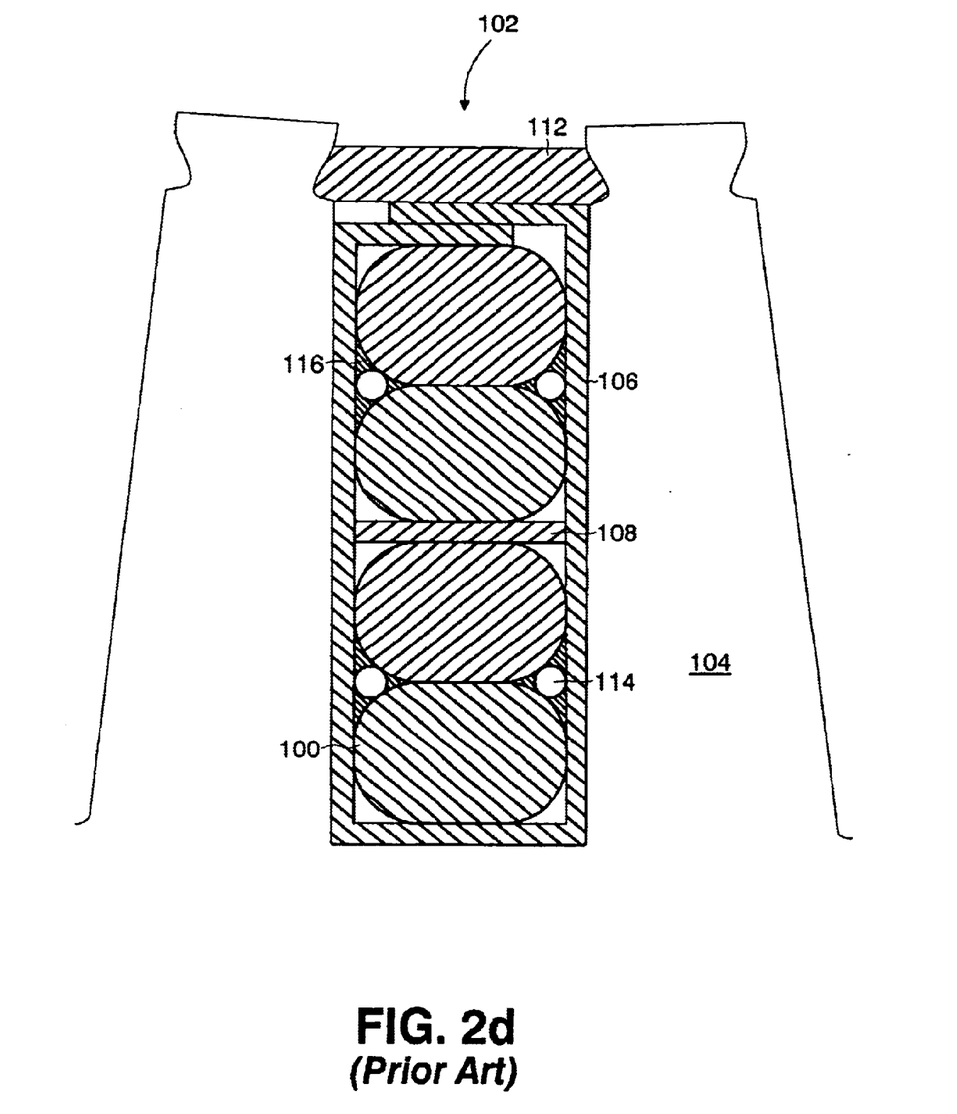

Referring now to FIG. 2d, half way through the curing process, taking great care so as not to tear the slot liner 106, the four steel wires 110 are then gently pulled out and removed to expose the interstitial oil cooling flow passages 114. The curing process is continued so that the remaining varnish coating will form a secondary dielectric insulation 116 on the magnet wires as well as fuse the slot liner end papers and steel laminates, thus forming a means of primary containment for the cooling oil along with maintaining oil flow passages.

There are major problems associated with this cooling design and methodology. Keeping the interstitial area open along the longitudinal axis of the stator has proven to be very problematic since manufacturing variation in the cross-section tends to create relatively high fluid flow pressure drops. Another issue is that the varnish, being a thin liquid, does not completely fill the gaps between the slot liner end papers, top sticks and the steel laminates, thus compromising the integrity of the oil's primary containment. However, the biggest issue with this sealing technique is that incurred by the large temperature differential of 140 degrees Centigrade between the inner diameter of the stator and the outside diameter of its aluminum alloy casting. The different thermal coefficients of expansion of the elements, mainly in the stator slots, create a complex system of 3-dimensional expansion and contraction due to this temperature differential of the operating motor. This movement creates such stresses in these sealing joints that the glass-like crystalline structure of the varnish tends to fracture. Thus, these differential thermal expansions and contractions lead to the destruction of any sealing provided by the varnish.

All these problems can be compounded to such a magnitude that the pressurized oil coolant will breach any flaw in its containment and flow radially towards the center of the stator, filling the air gap between the stator and rotor. At the relatively low speeds of 5,000 RPM or less, the cooling medium is churned and ground by the spinning rotor causing a drag force and hence mechanical losses to the output of the motor. At the maximum operating speed of 15,000 RPM, the cooling medium is subjected to heavy churning which not only results in major propulsion inefficiency, but causes high, localized temperatures that breaks down the oil's viscosity and hence, cooling capacity.

SUMMARY OF THE INVENTION

Therefore it is an object of the present invention to provide a rotating machine with cooled stator field windings having internal passages which provide an increased amount of cooling than is provided by prior art methods for cooling rotating machines.

In order to increase heat conduction away from the field windings of a stator of a rotating machine, oil coolant is passed through longitudinal passages defined in at least one of the field windings. The rotating machine of the present invention utilizes a unique design that is much more thermally robust than the traditional solid conductor approach. This principle has been demonstrated to be readily manufacturable and resides within the economic producibility of the motor.

In summary, there is provided an improved rotating machine. The improved rotating machine of the present invention comprises: a stator having a plurality of field winding slots; a plurality of field windings disposed in each of the field winding slots, at least two of the field windings are comprised of: an outer jacket; and a plurality of conductive wires disposed within and enclosed by the jacket such that longitudinal passages are defined therebetween; and circulation means for circulating a coolant into and from the rotating machine through the longitudinal passages.

In a preferred implementation of the rotating machine of the present invention, a housing is further provided. The housing has a cavity for acceptance of the stator therein. The housing and stator define first and second plenums at first and second ends of the stator. The coolant enters the rotating machine into the first plenum and exits the rotating machine from the second plenum.

The at least one field winding having the longitudinal passages preferably has at least one entry hole in the outer jacket which provides communication between the longitudinal passages and the first plenum and at least one exit hole in the outer jacket which provides communication between the longitudinal passages and the second plenum, wherein the coolant enters the longitudinal passages from the first plenum through the at least one entry hole and exits into the second plenum through the at least one exit hole.

The circulation means preferably comprises a pump disposed in an external conduit between the first and second plenums. A heat exchanger is also preferably disposed in the external conduit between the first and second ends for removing heat from the coolant re-circulated therein.

The rotating machine of the present invention further comprises an inpregnant disposed in the slots to seal the spaces between the outer jackets and walls of the slots.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Although this invention is applicable to numerous and various types of rotating machines, it has been found particularly useful in the environment of electric motors and generators. Therefore, without limiting the applicability of the invention to electric motors and generators, the invention will be described in such environment.

Figure 3:
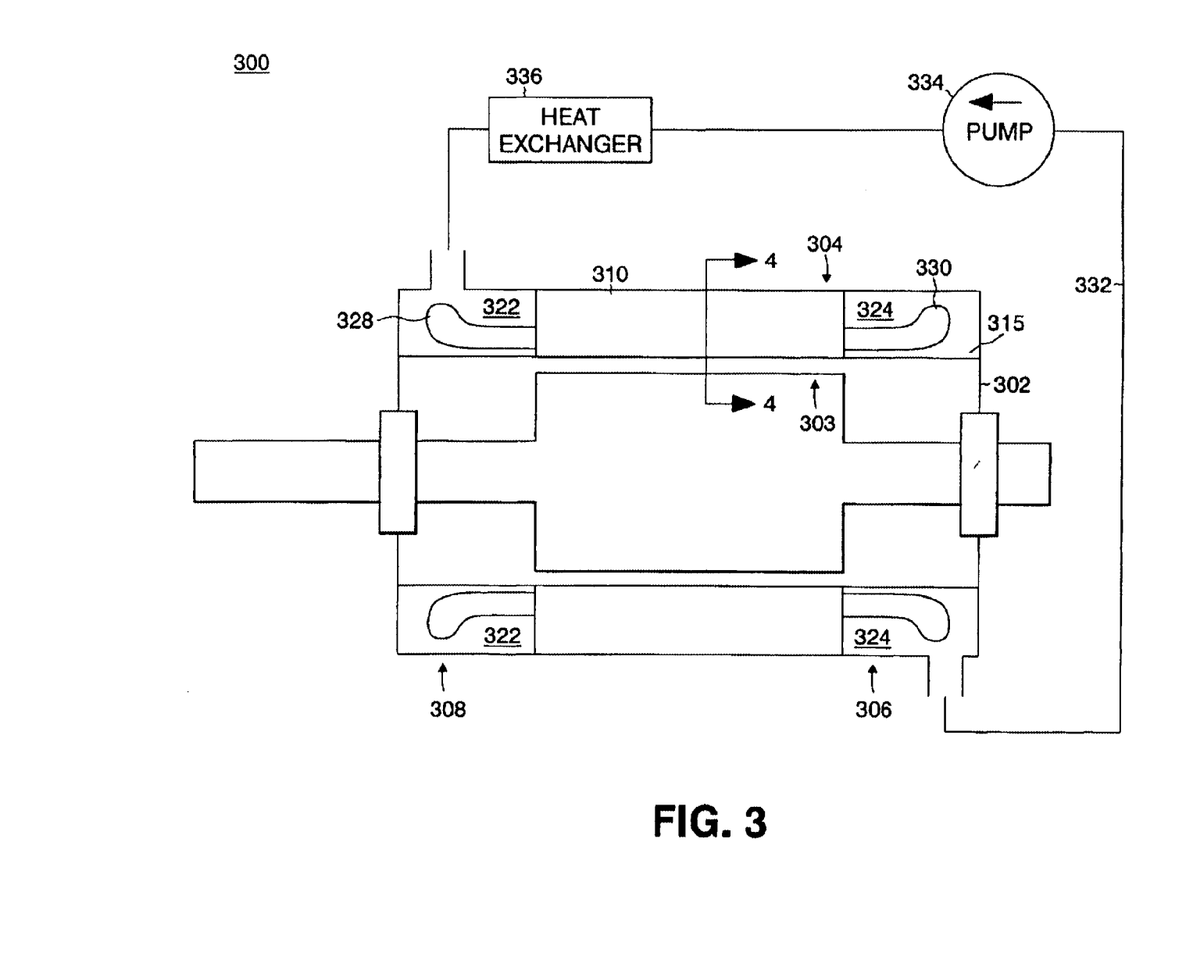
FIG. 3 illustrates a schematic view of the rotating machine of the present invention.

Referring now to FIG. 3, there is illustrated a rotating machine of the present invention, the rotating machine being referred to generally by reference numeral 300. The rotating machine 300 generally has a housing 302 encasing therein a rotor assembly 303 and a stator assembly 304. The rotating machine has a feed-through side 306 and a gear-box side 308.

Figure 4:
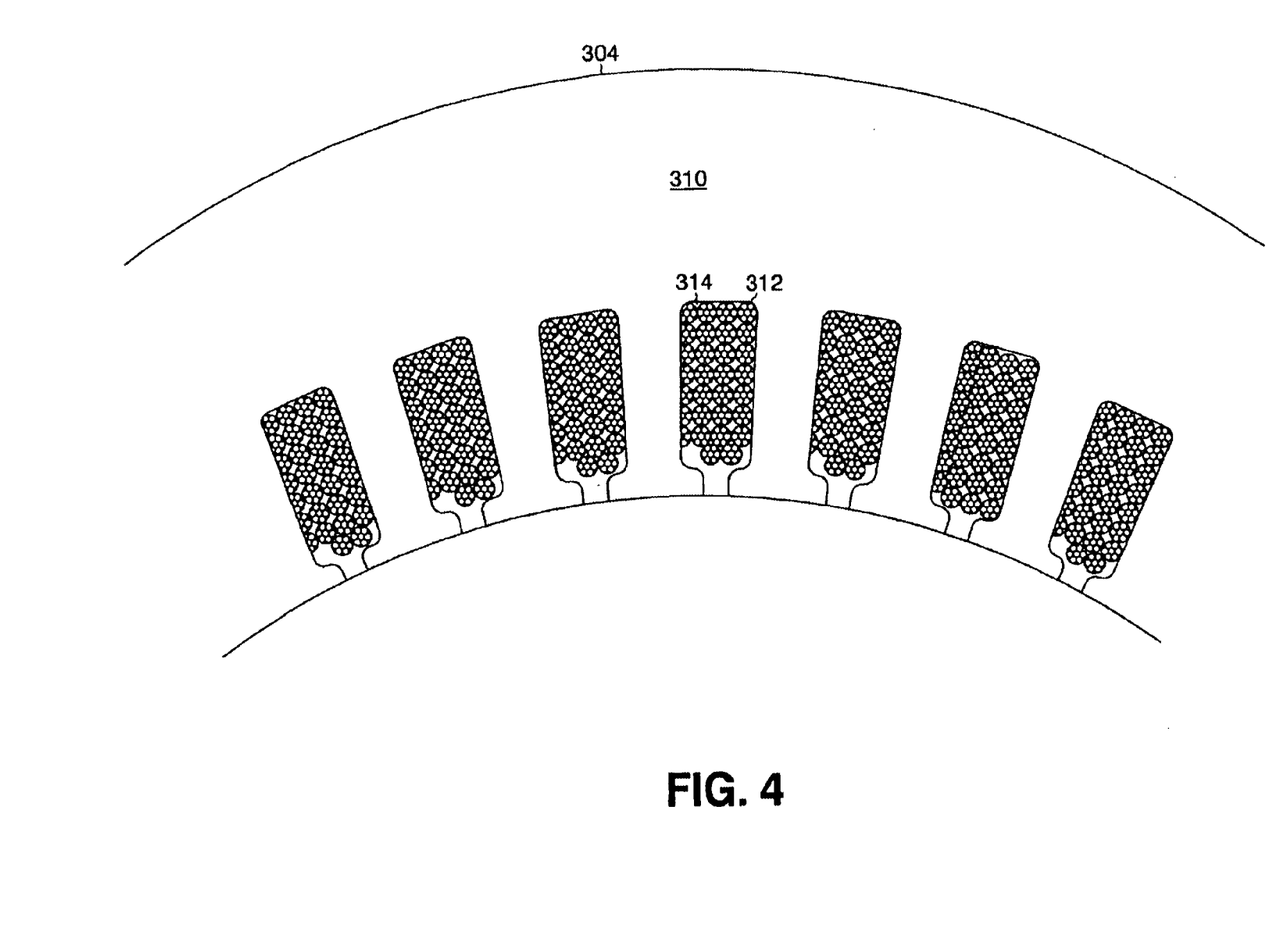
FIG. 4 illustrates a cross-sectional view of the rotating machine of FIG. 3 taken about line 4–4.

Referring now to FIG. 4, the stator assembly 304 comprises a stator 310. The stator 310 has a plurality of field winding slots 312 for housing at least one electromagnetic conductor 314, a loop of which is referred to as a field winding 315 (see FIG. 3).

Motors with large high frequency components of currents due primarily to the high frequency pulse width modulation of the drive inverter have been wound with a multi-strand jacketed wire, referred to in the art and alternatively herein as litz wire or litz-type wire, to reduce AC losses.

Figure 5:
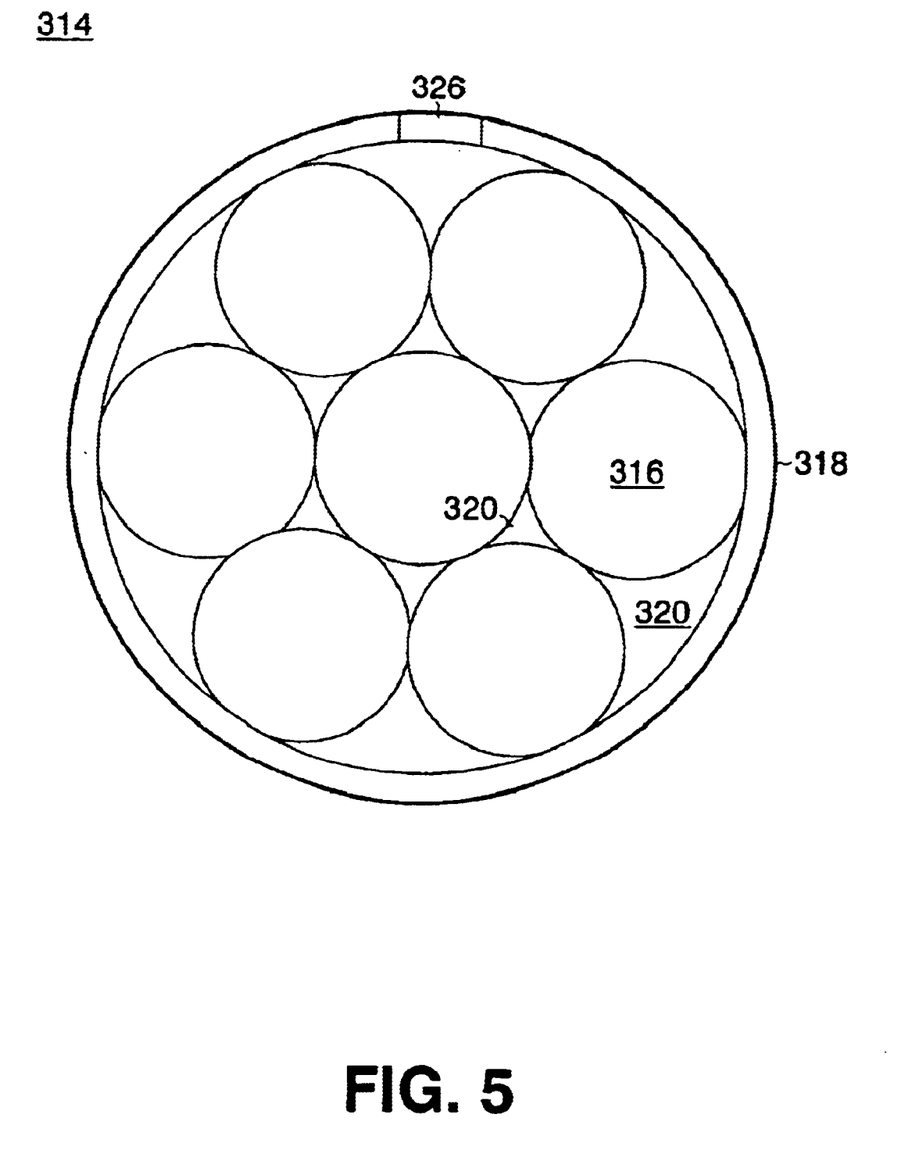
FIG. 5 illustrates a cross-sectional view of a jacketed multi-strand conductor used as a field winding in the stator slots of the rotating machine of FIG. 3.

Referring now to FIG. 5, there is shown a cross-sectional view of a litz wire conductor 314. Litz wire is made by weaving many insulated smaller wires 316 in a pattern such that no single wire 316 occupies the perimeter exclusively. Typically the conductive wires 316 are wound within an outer jacket 318 in a helical pattern to form helical shaped longitudinal passages 320 between the individual wires 316. This effectively eliminates skin effect in the litz wire conductor 314. One of the trade-offs in using litz wire is that the cross-section of copper is inherently reduced. The multiple small wires 316 cannot be packed with 100% fill factor, therefore a significant amount of space remains between the individual wires 316 of the litz wire conductor 314.

The rotating machine 300 of the present invention takes advantage of these longitudinal passages 320 by introducing a heat transfer fluid into them. Thus, the conductors for the stator 312 are made from a litz, or litz type wire, consisting of multiple smaller circular cross-section wires 316 bundled together. The bundle of wires 316 is then further insulated with one or more films that produce an outer jacket 318 over the wire bundle as shown in FIG. 5.

Litz wire of this type of construction is readily available from multiple sources. The outer film jacket 318 is added for insulation value and mechanical protection and is preferably flexible such that the litz wire 314 can be wound within the stator slots 312. The outer jacket 318, besides providing electrical insulation and mechanical protection, provides a flexible tubing for containment of the heat transfer fluid. The stator 310 is wound in a conventional fashion with the litz wire 314 having the outer jacket 318. Slot liners (see reference numeral 106 in FIG. 1) are then unnecessary due to the additional insulating properties of the outer jacket 318 on the litz wire 314. This reduces motor winding costs and allows for more copper (i.e., conductor) to be put in each slot 312.

After winding the stator 310 with the litz wire 314, the slots 312 are filled with an inpregnant, in a conventional manner, to restrain the wire from moving and to improve heat transfer. First and second plenums 322, 324 or manifolds are formed at each end of the stator by rings (not shown) that isolate each stator end from the rotor cavity. The outside of each plenum 322, 324 is formed by the stator housing 302 and the end rings.

FIG. 3 shows the coolant flow through the stator 304. Coolant, such as oils known to those skilled in the art, enter the rotating machine 300 into the first plenum 322 at the gearbox side 308 and exit the rotating machine 300 from the second plenum 324 on the feed-through side 306. The flow of coolant from the first plenum 322 at one end 308 of the rotating machine 300 to the second plenum 324 at the other end 306 of the rotating machine 300 is through the longitudinal passages 320 in the litz wire 314 (see FIG. 5). As discussed previously, the coolant is prevented from penetrating the slot 312 directly by a inpregnant that fills the voids between the wire 314 and the stator laminations. This prevents coolant from getting into the gap between the rotor 303 and the stator 304 and producing high viscous losses.

The coolant is allowed to penetrate and exit the longitudinal passages 320 inside the litz wire 314 by violating the integrity of the outer jacket 318 in a manner that will not compromise the electrical characteristics in the area of the first and second plenums 322, 324. Referring back to FIG. 5, the coolant is preferably introduced into the longitudinal passages 320 in the litz wire 314 by at least one entry hole 326 in the outer jacket 318 which provides fluid communication between the longitudinal passages 320 and the first plenum 322. Preferably, entry holes 326 are located about the circumference of the outer jacket 318 such that coolant is ensured of penetrating all of the longitudinal passages 320.

The entry hole 326 is preferably located on the loop portion 328 of each field winding 315 corresponding to the first plenum 322. After traveling from the first plenum 322 and through the longitudinal passages 320 in the litz wire 314, the coolant preferably exits into the second plenum 324 from the longitudinal passages 320 through an exit hole in the outer jacket 318. The exit hole is similar to the entry hole shown in FIG. 5 but is preferably located on a loop portion 330 of each field winding corresponding to the second plenum 324. Thus, the exit hole in the outer jacket 318 provides fluid communication between the longitudinal passages 320 and the second plenum 324 by which the coolant leaves the longitudinal passages 320 through the exit hole and enters into the second plenum 324. As with the entry holes 326, a plurality of exit holes located about the circumference of the outer jacket 318 is preferred. Of course, those skilled in the art will recognize that the coolant flow can also be from the second plenum to the first plenum without departing from the scope or spirit of the present invention.

Referring back to FIG. 3, the rotating machine 300 of the present invention also has a circulation means for re-circulation of the coolant from the second plenum 324 into the first plenum 322 through an external conduit 332 which connects the first and second plenums 322, 324. The circulation means preferably comprises a pump 334 disposed in the external conduit 332 between the first and second plenums 322, 324. A heat exchanger 336 is also preferably disposed in the external conduit 332 between the first and second plenums 322, 324 for removing heat from the coolant re-circulated therein.

Those skilled in the art will recognize that the improved rotating machine of the present invention provides direct contact between the litz wire and the heat transfer fluid to achieve efficient heat transfer and allows for an extremely compact design that has high reliability due to low AC losses and low operating temperatures.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A rotating machine comprising:

a stator having a plurality of field winding slots;

a plurality of field windings disposed in each of the field winding slots, at least two of the field windings are comprised of:

an outer jacket having an entry hole and an exit hole, each formed in a side wall thereof; and a plurality of conductive wires disposed within and enclosed by the outer jacket such that longitudinal passages are defined therebetween, at least one of the longitudinal passages being in fluid communication with the entry hole and the exit hole; and circulation means for circulating a coolant into and from the rotating machine through the longitudinal passages.

2. The rotating machine according to claim 1, wherein the outer jacket comprises a plurality of entry holes and a plurality of exit holes distributed around the circumference of the jacket.

3. The rotating machine according to claim 1, wherein the at least two field windings are arranged such that the entry hole is positioned adjacent a first end of the stator, and the exit hold is positioned adjacent an opposite end of the stator.

4. The rotating machine according to claim 1, wherein the entry hole is located on a first loop portion of the field winding, and the exit hold is located on a second loop portion of the field winding.

5. A rotating machine comprising:

a stator having a plurality of field winding slots;

a plurality of field windings disposed in each of the field winding slots, at least two of the field windings are comprised of:

an outer jacket; and a plurality of conductive wires disposed within and enclosed by the outer jacket such that longitudinal passages are defined therebetween; and circulation means for circulating a coolant into and from the rotating machine through the longitudinal passages, wherein the conductive wires are wound within the outer jacket to form helical shaped longitudinal passages.

6. A rotating machine comprising:

a stator having a plurality of field winding slots;

a plurality of field windings disposed in each of the field winding slots, at least two of the field windings are comprised of:

an outer jacket; and a plurality of conductive wires disposed within and enclosed by the outer jacket such that longitudinal passages are defined therebetween;

circulation means for circulating a coolant into and from the rotating machine through the longitudinal passages; and a housing, the housing having a cavity for acceptance of the stator therein, the housing and stator defining first and second plenums at first and second ends of the stator, the coolant entering the rotating machine into the first plenum and exiting the rotating machine from the second plenum, wherein the at least two field windings having the longitudinal passages further having an exit hole in the outer jacket which provides communication between the longitudinal passages and the second plenum, the coolant leaving the longitudinal passages through the exit hole into the second plenum for re-circulation into the first plenum, the first and second plenums being connected with an external conduit.

7. The rotating machine of claim 6, wherein the circulation means comprises a pump disposed in the external conduit between the first and second plenums.

8. The rotating machine of claim 6, further comprising a heat exchanger disposed in the external conduit between the first and second ends for removing heat from the coolant re-circulated therein.

9. A rotating machine comprising:

a stator having a plurality of field winding slots;

a plurality of field windings disposed in each of the field winding slots, at least two of the field windings are comprised of:

an outer jacket; and a plurality of conductive wires disposed within and enclosed by the outer jacket such that longitudinal passages are defined therebetween;

circulation means for circulating a coolant into and from the rotating machine through the longitudinal passages; and a housing, the housing having a cavity for acceptance of the stator therein, the housing and stator defining first and second plenums at first and second ends of the stator, the coolant entering the rotating machine into the first plenum and exiting the rotating machine from the second plenum, wherein the at least two field windings having the longitudinal passages further having at least one entry hole in the outer jacket providing communication between the longitudinal passages and the first plenum and at least one exit hole in the outer jacket providing communication between the longitudinal passages and the second plenum, wherein the coolant enters the longitudinal passages from the first plenum through the at least one entry hole and exits into the second plenum through the at least one exit hole.

10. The rotating machine of claim 9, wherein each of the plurality of field windings has the outer jacket and longitudinal passages.

11. The rotating machine of claim 9, wherein the outer jacket is a flexible elastomer.

12. The rotating machine of claim 9, wherein the plurality of conductive wires disposed within the jacket are circular in cross-section.

13. The rotating machine of claim 9, wherein the outer jacket comprises at least one film disposed over the conductive wires.

* * * * *